(12) United States Patent
Jackstadt et al.

(10) Patent No.: US 11,376,892 B2
(45) Date of Patent: Jul. 5, 2022

(54) PNEUMATIC VEHICLE TYRE

(71) Applicant: Continental Reifen Deutschland GmbH, Hannover (DE)

(72) Inventors: Michael Jackstadt, Gehrden (DE); Matthias Seng, Hannover (DE); Juergen Dzick, Seelze (DE); Denise Sperl, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 340 days.

(21) Appl. No.: 16/469,327

(22) PCT Filed: Oct. 19, 2017

(86) PCT No.: PCT/EP2017/076652
§ 371 (c)(1),
(2) Date: Jun. 13, 2019

(87) PCT Pub. No.: WO2018/108358
PCT Pub. Date: Jun. 21, 2018

(65) Prior Publication Data
US 2020/0108667 A1 Apr. 9, 2020

(30) Foreign Application Priority Data

Dec. 13, 2016 (DE) ...................... 10 2016 224 803.0

(51) Int. Cl.
*B60C 11/12* (2006.01)
*B60C 11/11* (2006.01)
(52) U.S. Cl.
CPC .......... *B60C 11/1204* (2013.01); *B60C 11/11* (2013.01); *B60C 11/1272* (2013.01); *B60C 2011/1209* (2013.01)

(58) Field of Classification Search
CPC . B60C 11/1204; B60C 11/12; B60C 11/1281; B60C 11/1218; B60C 11/1272
See application file for complete search history.

(56) References Cited

U.S. PATENT DOCUMENTS

| 2012/0006457 A1* | 1/2012 | Miyazaki | ............ B60C 11/0306 152/209.21 |
| 2016/0144665 A1* | 5/2016 | Koishikawa | ........ B60C 11/0327 152/209.1 |
| 2020/0317004 A1* | 10/2020 | Speziari | .............. B60C 11/1218 |

FOREIGN PATENT DOCUMENTS

| CA | 2783999 A1 | 8/2011 |
| DE | 102010000272 A1 | 8/2011 |

(Continued)

OTHER PUBLICATIONS

JP 2002316517 Machine Translation; Takahashi; Toshihiko (Year: 2002).*

(Continued)

*Primary Examiner* — Robert C Dye
*Assistant Examiner* — Nicholas J Weiler
(74) *Attorney, Agent, or Firm* — David L. Cate; Gregory Adams

(57) ABSTRACT

A pneumatic vehicle tire having a tread with profile blocks (4) formed by circumferential or diagonal grooves (1) and by transverse grooves (2), said profile blocks (4) each being provided with at least one sipe (5) that is straight or slightly curved in plan view, extends at least substantially parallel to the transverse grooves (2) and has a width of 0.3 mm to 2.0 mm, wherein the sipe (5) is bounded by two sipe walls (6), and wherein at least one protrusion (8) is provided on each of the otherwise unstructured sipe walls (6). The protrusion (8) formed on one sipe wall (6) is offset in the direction of (Continued)

extent of the sipe (5) with respect to the protrusion (8) formed on the other sipe wall (6), without a mutual overlap.

17 Claims, 2 Drawing Sheets

(56) References Cited

FOREIGN PATENT DOCUMENTS

| | | | | |
|---|---|---|---|---|
| EP | 1974956 | A1 | 10/2008 | |
| JP | H10-52824 | A  * | 2/1998 | ......... B60C 11/1218 |
| JP | H11105512 | A | 4/1999 | |
| JP | 2000177330 | A | 6/2000 | |
| JP | 2002316517 | A | 10/2002 | |
| JP | 2009126293 | A | 6/2009 | |
| JP | 2013006549 | A | 1/2013 | |
| WO | 0160642 | A1 | 8/2001 | |
| WO | 2010063558 | A1 | 6/2010 | |

OTHER PUBLICATIONS

JP 2009126293 Machine Translation; Hashimoto, Yoshimasa (Year: 2009).*

JP H10-52824 Machine Translation; Masashirou, Moriya (Year: 1998).*

DE 102010000272 Machine Translation; Seng, Matthias (Year: 2011).*

* cited by examiner

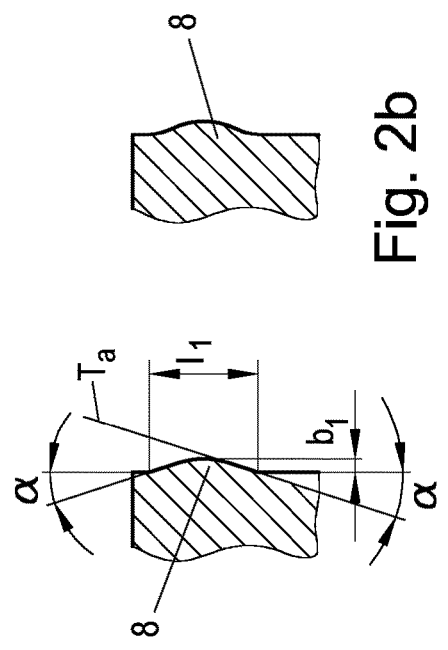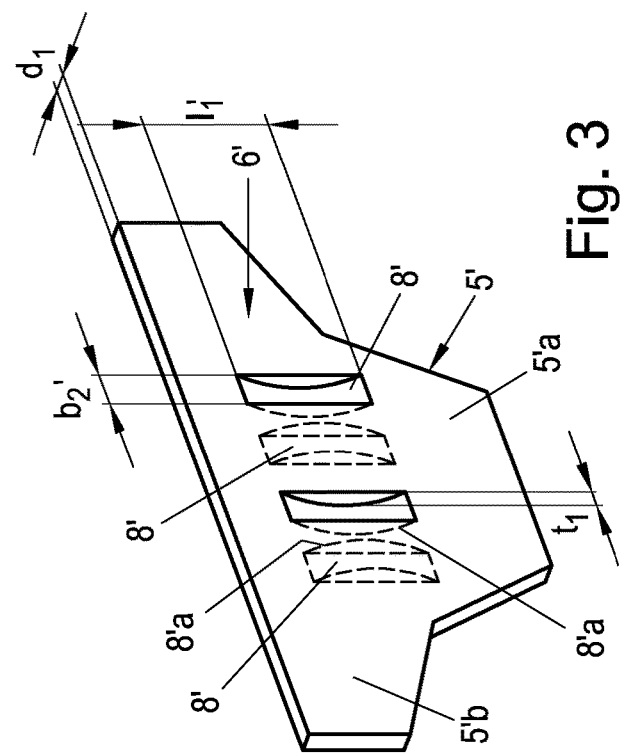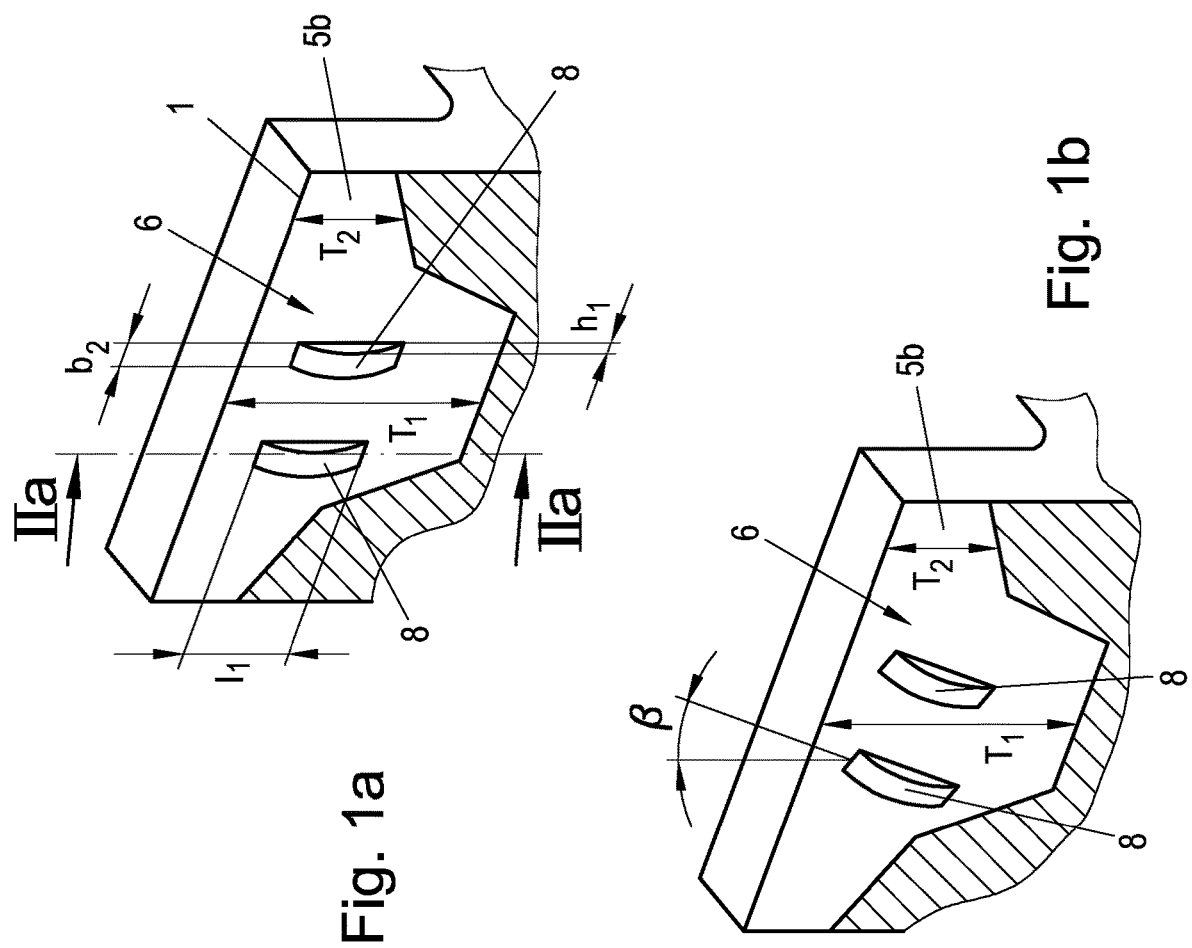

PNEUMATIC VEHICLE TYRE

The invention relates to a pneumatic vehicle tire having a tread with profile blocks formed by circumferential or diagonal grooves and by transverse grooves, said profile blocks each being provided with at least one sipe that is straight or slightly curved in plan view, extends at least substantially parallel to the transverse grooves and has a width of 0.3 mm to 2.0 mm, wherein the sipe is bounded by two sipe walls, and wherein at least one protrusion is provided on each of the otherwise unstructured sipe walls.

A pneumatic vehicle tire of this type is known from DE 10 2010 000 272 A1. Mutually corresponding protrusions and recesses are formed on opposite sipe walls. The protrusions are each embodied as rounded elevations and surrounded by unstructured wall regions. At individual points in the radially outer region of one sipe wall, protrusions are arranged that each have a flattened side that forms a support face oriented in a radial direction and substantially perpendicular to the sipe wall. In the radially inner region of the sipe wall, protrusions are arranged that have a flattened side that forms a support face oriented substantially parallel to the surface of the positive profile. As a result of these measures, the stiffness of the positive profile is intended to be influenced such that, with increasing wear, the positive profile can initially readily absorb lateral forces and subsequently can optimally distribute circumferential forces, in order to allow uniform wear.

Pneumatic vehicle tires with treads having sipes are conventional for use in winter driving conditions. The sipes contribute significantly toward good grip properties and good traction and braking behavior on wet ground and on ice- and/or snow-covered ground. Usually, sipes have widths of 0.3 mm to 2.0 mm, in particular up to 0.8 mm, wherein the sipes can extend substantially in the transverse direction of the tread or, depending on the tread profiling, at an angle of up to about 50° to the transverse direction. In order to form the sipes during the vulcanization of the tire, sipe blades of corresponding shape are anchored in the tread-forming mold parts or mold segments of the vulcanization mold.

Sipe blades that form sipes that extend in a straight or slightly arcuate manner in plan view are embodied somewhat thicker, for stability reasons, than sipe blades that form sipes that are wavelike, for example, in plan view. Accordingly, sipes that extend in a straight or slightly arcuate manner are—compared with other sipes—usually embodied in a wider manner. These wider, straight sipes contribute more to the rolling noise of the tire than sipes extending for instance in a wavelike manner, since they form a larger resonance chamber.

The invention is based on the object, in the case of a tire of the type mentioned at the beginning, of reducing the amount of rolling noise caused by sipes that extend in a straight or slightly curved manner in plan view.

The set object is achieved according to the invention in that the protrusion formed on one sipe wall is offset in the direction of extent of the sipe with respect to the protrusion formed on the other sipe wall, without a mutual overlap.

As a result of the protrusions arranged, according to the invention, in an offset manner with respect to one another on opposite sipe walls, the excitation of natural frequencies within the sipe can be substantially reduced on account of the "division" of the resonance chamber. In addition, in the case of transverse forces, the protrusions cause stiffening of the positive profile, with the result that the handling properties of the tire can be favourably influenced. As a result, the protrusions can also contribute toward improving the wear performance of the tread.

In one preferred embodiment of the invention, in each case two or three protrusions are formed at least on one sipe wall, preferably on both sipe walls, wherein all the protrusions formed on one sipe wall are offset in the direction of extent of the sipe with respect to all the protrusions formed on the other sipe wall, and wherein, as seen in the direction of extent of the sipe, the protrusions alternate with one another. Embodiments with more than one protrusion per sipe wall are not only particularly advantageous, because they prevent excitation of natural frequencies within the sipe particularly well, but also bring about particularly good support in the case of transverse forces.

According to a further preferred configuration of the invention, the protrusions are formed in an elongate manner in a radial direction and can therefore maintain their effect over the lifetime of the tire.

Furthermore, an embodiment in which the protrusions have a longitudinal extent of 3.0 mm to 7.0 mm in the radial direction on the respective sipe wall is particularly preferred. The greater the longitudinal extent, the more the protrusions maintain their effect with increasing wear of the tread.

In a further advantageous embodiment of the invention, the protrusions have a height, perpendicular to the sipe wall, that is 20% to 80%, in particular 30% to 50%, of the width of the sipe. The height of the protrusions has in particular an impact on the supporting effect achievable therewith.

The width of the protrusions, transversely to their longitudinal extent in the radial direction, can be 1.0 mm to 8.0 mm, in particular up to 4.0 mm.

Preferably, the protrusions provided according to the invention extend exactly in the radial direction. In an alternative embodiment of the invention, the protrusions extend at an angle of up to 20°, in particular of up to 10°, to the radial direction.

Furthermore, an embodiment of the protrusions with a rounded outer side, such that they are not damaged in the case of transverse forces, is preferred.

In a further embodiment variant of the invention, in one sipe, all the protrusions are configured in a matching manner, but, alternatively, the protrusions formed on one sipe wall can also have different lengths and/or different widths and/or different heights. Furthermore, on one sipe wall in one sipe, at least one protrusion can be formed, which differs from at least one protrusion on the opposite sipe wall in terms of length and/or width and/or height. In particular, such embodiment variants are particularly advantageous for reducing rolling noise.

In order to prevent the occurrence of cracks in the sipe walls in the region of the protrusions, in particular under the action of transverse forces, it is advantageous when the protrusions transition into the respective sipe wall without a bend at least in their end regions located in the radial direction, or when, as seen in longitudinal section through the protrusions, tangents through points in these end regions enclose an angle of 10° to 30° with the respective sipe wall.

It has been found to be particularly advantageous for reducing rolling noise when in each case a single sipe, each with at least one protrusion on each sipe wall, is provided substantially centrally in shoulder-side profile blocks of the tread.

Further features, advantages and details of the invention will now be described in more detail on the basis of the drawing, which schematically shows exemplary embodiments of the invention. In the drawings:

FIG. 1a shows a view of a sipe wall with one embodiment variant of the invention, FIG. 1b shows a view of a sipe wall with a further embodiment variant of the invention, FIG. 2a shows a section along the line IIa-IIa in FIG. 2, FIG. 2b shows a section along analogous to FIG. 2a with a variant of the invention, and FIG. 3 shows a sipe blade of a vulcanization mold in an oblique view.

Figure 1:
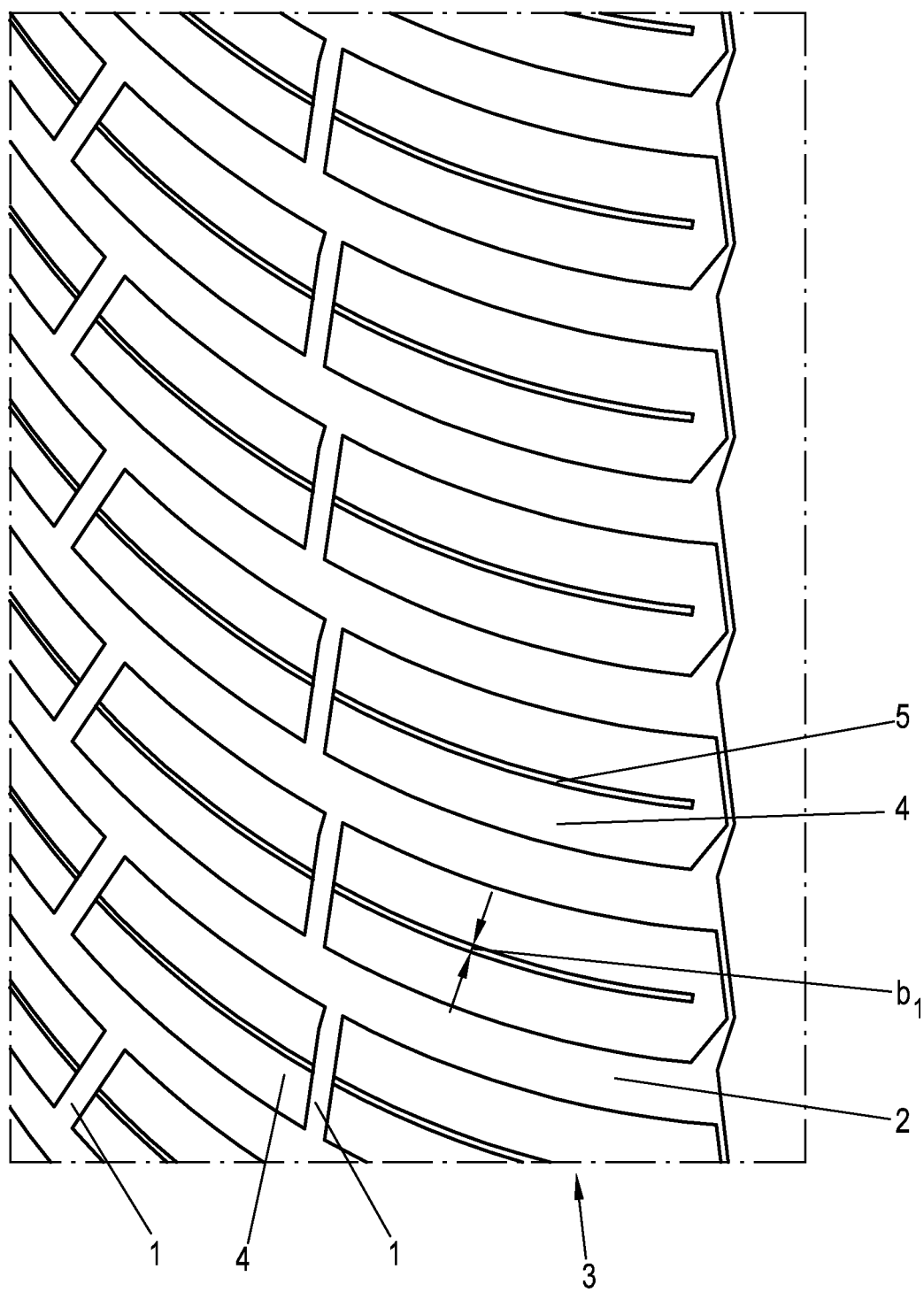
FIG. 1 shows a plan view of a tread region of a pneumatic vehicle tire.

The invention deals with the configuration of sipes in treads of pneumatic vehicle tires of radial type of construction, in particular pneumatic vehicle tires of passenger cars, vans or light trucks.

The tread region shown by way of example in FIG. 1 is subdivided into profile block rows 3 with profile blocks 4 by circumferential or diagonal grooves 1 and transverse grooves 2. The transverse grooves 2 extend parallel to one another at an acute angle to the circumferential direction, said angle increasing toward the tread edge. Formed approximately centrally in each of the profile blocks 4 is a sipe 5 that extends parallel to the transverse grooves 2 and in a straight or slightly arcuate manner in plan view and is bounded by two mutually opposite sipe walls 6, of which in each case one can be seen in FIGS. 1a and 1b. In other embodiments of the tread, profile blocks with more than one sipe 5 can be provided.

The pneumatic vehicle tire is formed in a known manner by means of a vulcanization mold, which is provided with mold segments or mold parts that provide the tread with its profiling, wherein, to form the sipes 5 in the tread, sipe blades are anchored on the inner side of the mold segments or mold parts. FIG. 3 shows, in a simplified manner, that part of a sipe blade 5' that forms a sipe in the rubber of the tread. The sipe blade 5' has an in particular constant thickness $d_1$ of 0.3 mm to 2.0 mm, preferably up to 0.8 mm, such that the sipes 5 accordingly have a width $b_1$ (FIG. 1) of 0.3 mm to 2.0 mm, preferably up to 0.8 mm.

The illustrated sipe blade 5' forms in the tread a sipe 5 having a depth that varies over the sipe profile (FIGS. 1a, 1b), and has a central blade part 5'a and two lateral blade parts 5'b. As FIG. 1a and FIG. 1b show, the sipe 5 and therefore the shown sipe wall 6 have a deep central portion 5a formed by the central blade part 5'a and two shallower lateral portions 5b, adjoining the latter, that are formed by the lateral blade parts 5'b. The central portion 5a extends in a radial direction down to a depth $T_1$ of for example 6.0 mm to 9.0 mm, and the lateral portions 5b extend in a radial direction down to a depth $T_2$ that is preferably at most 70% of the depth $T_1$ and decreases toward the lateral edges of the sipe wall 6.

The sipe blade 5' has two side faces 6' that are unstructured apart from recesses 8', said side faces 6' forming the sipe walls 6 of the sipe 5 during vulcanization. Formed on each side face 6', in the central blade part 5'a, are in each case two shallow recesses 8' that are elongate in a radial direction. The recesses 8' formed in one side face 6' are offset in the direction of the longitudinal extent of the sipe blade 5' with respect to the recesses 8' formed in the other side face 6', wherein in each case one recess 8' in one side face 6' alternates with a recess 8' in the other side face 6' and the recesses 8' formed in one side face 6' do not overlap the recesses 8' that are formed in the other side face 6'. The recesses 8' are formed conjointly during the production of the sipe blade 5'.

Each recess 8' has a length $l_1'$ (FIG. 3) of 3.0 mm to 7.0 mm along a centerline in the direction of its radial extent. Furthermore, each recess 8' has, at its widest point on the side face 6', a width $b_2'$, determined perpendicularly to its centerline, of 1.0 mm to 8.0 mm, in particular up to 4.0 mm, and so, in a preferred embodiment of the recesses 8', their length $l_1'$ is greater than their width $b_2'$.

Each recess 8' is bounded by a bottom 8'a that is curved in its radial extent, wherein each recess 8' has its greatest depth $t_1'$ preferably in its middle with respect to the side face 6', said depth being 20% to 80%, in particular 30% to 50%, of the thickness $d_1$ of the sipe blade 5'.

In the embodiment variant shown, the recesses 8' furthermore have side faces in the form or substantially in the form of circular segments (not indicated in the figures), which bound the recesses 8' together with the bottom 8'a and accordingly extend between the bottom 8'a and the side face 6'. In an alternative embodiment that is not shown, the recesses 8' can be embodied as a whole in a rounded manner.

The sipe wall 6 shown by way of example in FIG. 1a is formed with the rear side face 6' of the sipe blade 5' and therefore has two protrusions 8 that are elongate in a radial direction and the length $l_1$ of which, corresponding to the length of the recesses 8', is 3.0 mm to 7.0 mm. Furthermore, the protrusions 8 have a greatest width $b_2$ which, corresponding to the width $b_2'$ of the recesses 8', is 1.0 mm to 8.0 mm, in particular up to 4.0 mm. Perpendicular to the sipe wall 6, the protrusions 8 have a height $h_1$, corresponding to the depth $t_1'$ of the recesses 8', that is 20% to 80%, in particular 30% to 50%, of the width $b_1$ of the sipe 5. The outer face of the protrusions 8 is rounded, as shown in FIG. 2a, wherein tangents $T_a$ through points at the longitudinal ends of the protrusions 8 enclose an angle α of 10° to 30° with the sipe wall 6.

FIG. 2b shows an embodiment variant in which a protrusion 8 transitions into the sipe wall 6 without a bend via rounded portions at its ends located in the longitudinal extent.

Corresponding to the positions of the recesses 8' in the sipe blade 5', the protrusions 8 formed in one sipe wall 6 are offset in the direction of extent of the sipe 5 with respect to the protrusions 8 formed in the other sipe wall 6 by the recesses 8', such that the protrusions 8 are formed in regions of the sipe walls 6 that are not located opposite one another.

As the variant in FIG. 1b shows, the protrusions 8 and thus also the protrusions 8 formed in an offset manner on the opposite sipe wall extend at an angle β of up to 20° to the radial direction. A combination of at least one protrusion 8 extending in a radial direction with at least one protrusion 8 extending in an inclined manner to the radial direction per sipe wall 6 is also possible.

All the protrusions 8 on the walls 6 of a sipe 5 can be designed in a matching manner. However, the protrusions 8 formed on one sipe wall 6 can also have different lengths 11 and/or different widths $b_1$ and/or different heights $h_1$.

Profile blocks 4 with in each case one sipe 5 designed according to the invention are in particular shoulder blocks, between which transverse grooves 2 extending substantially in a transverse direction are present, as shown in FIG. 1.

LIST OF REFERENCE SIGNS

1 . . . Circumferential groove
2 . . . Transverse groove
3 . . . Profile block row
4 . . . Profile block
5 . . . Sipe 5' ... Sipe blade
5'a, 5'b ... Blade part
6 ... Sipe wall
5a ... Central portion
5b ... Lateral portion
6' ... Side face
8 ... Protrusion
8' ... Recess
8'a ... Bottom
$b_1, b_2, b_2'$ ... Width
$d_1$ ... Thickness
$h_1$ ... Height
$l_1, l_1'$ ... Length
$t_1$ ... Depth
$T_1, T_2$ ... Depth
$T_a$ ... Tangent
$\alpha, \beta$ ... Angle

The invention claimed is:

1. A pneumatic vehicle tire comprising a tread with profile blocks formed by circumferential or diagonal grooves and by transverse grooves, wherein the profile blocks each have at least one sipe which is straight or slightly curved and extends at least substantially parallel to the transverse grooves, wherein the at least one sipe has a width of 0.3 mm to 2.0 mm, wherein the sipe is bounded by two sipe walls, and wherein at least one protrusion is provided on each of the two sipe walls;
wherein the protrusion formed on one of the two sipe walls is offset with respect to the protrusion formed on the other of the two sipe walls, without a mutual overlap;
wherein each protrusion provided on each of the two sipe walls has a rounded outer face, and wherein tangents ($T_a$) through points at the longitudinal ends of each of the protrusions enclose an angle $\alpha$ of 10° to 30° with the sipe wall;
wherein the protrusions extend at an angle ($\beta$) of up to 20°, relative the radial direction, provided the angle ($\beta$) is not 0°; and,
wherein each round face of each of the protrusions is curved in the radial direction.

2. The pneumatic vehicle tire as claimed in claim 1, wherein two protrusions are provided on at least one of the two sipe walls, wherein the two protrusions on one sipe wall are offset with respect to the protrusion formed on the other sipe wall, and wherein the protrusions alternate with one another.

3. The pneumatic vehicle tire as claimed in claim 2, wherein two protrusions are provided on each of the two sipe walls, wherein the two protrusions on one sipe wall are offset with respect to the protrusions formed on the other sipe wall, and wherein the protrusions alternate with one another.

4. The pneumatic vehicle tire as claimed in claim 1, wherein three protrusions are provided on at least one of the two sipe walls, wherein the three protrusions on one sipe wall are offset with respect to the protrusion formed on the other sipe wall.

5. The pneumatic vehicle tire as claimed in claim 4, wherein three protrusions are provided on each of the two sipe walls, wherein the three protrusions on one sipe wall are offset with respect to the protrusions formed on the other sipe wall, and wherein the protrusions alternate with one another.

6. The pneumatic vehicle tire as claimed in claim 1, wherein the protrusions are formed in an elongate manner in a radial direction.

7. The pneumatic vehicle tire as claimed in claim 1, wherein the protrusions have an length li of from 3.0 mm to 7.0 mm in the radial direction on the two sipe walls.

8. The pneumatic vehicle tire as claimed in claim 1, wherein the protrusions have a height ($h_1$), perpendicular to the sipe wall, which is from 20% to 80% of the width of the sipe .

9. The pneumatic vehicle tire as claimed in claim 8, wherein the protrusions have a height ($h_1$) which is from 30% to 50% of the width of the sipe .

10. The pneumatic vehicle tire as claimed in claim 1, wherein the protrusions have a greatest width ($b_2$) of from 1.0 mm to 8.0 mm.

11. The pneumatic vehicle tire as claimed in claim 10, wherein the protrusions have a greatest width ($b_2$) of from 1.0 mm to 4.0 mm.

12. The pneumatic vehicle tire as claimed in claim 1, wherein the protrusions extend at an angle ($\beta$) of up to 10°, provided the angle ($\beta$) is not 0°.

13. The pneumatic vehicle tire as claimed in claim 1, in one sipe, all of the protrusions are configured in a matching manner.

14. The pneumatic vehicle tire as claimed in 1, wherein the protrusions formed on one sipe wall in one sipe have one or more of different lengths ($l_1$), different widths ($b_1$) or different heights ($h_1$).

15. The pneumatic vehicle tire as claimed in 1, wherein, on one sipe wall in one sipe, at least one protrusion is formed, which differs from at least one protrusion on the other sipe wall in terms of one or more of length ($l_1$), width ($b_1$) or height ($h_1$).

16. The pneumatic vehicle tire as claimed in 1, wherein the protrusions transition into the sipe wall without a bend at least in their end regions located in the radial direction.

17. The pneumatic vehicle tire as claimed in 1, wherein in each case a single sipe, each with at least one protrusion on each sipe wall, is provided substantially centrally in shoulder-side profile blocks of the tread.

* * * * *